United States Patent
Fischer et al.

(10) Patent No.: US 10,274,919 B2
(45) Date of Patent: Apr. 30, 2019

(54) METHOD, DEVICE AND COMPUTER PROGRAM PRODUCT FOR PROGRAMMING A PLURALITY OF CONTROL UNITS

(71) Applicant: Bayerische Motoren Werke Aktiengesellschaft, Munich (DE)

(72) Inventors: Michael Fischer, Munich (DE); Hans-Joerg Voegel, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 281 days.

(21) Appl. No.: 15/203,902

(22) Filed: Jul. 7, 2016

(65) Prior Publication Data

US 2016/0313715 A1    Oct. 27, 2016

Related U.S. Application Data

(63) Continuation of application No. PCT/EP2014/076717, filed on Dec. 5, 2014.

(30) Foreign Application Priority Data

Jan. 8, 2014   (DE) ........................ 10 2014 200 089

(51) Int. Cl.
 *G06F 8/65*    (2018.01)
 *G05B 19/042*  (2006.01)
 (Continued)

(52) U.S. Cl.
 CPC ...... *G05B 19/0426* (2013.01); *B60R 16/0231* (2013.01); *G05B 15/02* (2013.01);
 (Continued)

(58) Field of Classification Search
 CPC ...... G05B 19/042; G05B 8/654; G05B 8/655; G05B 2219/23316; G05B 2219/25032; G06F 13/42
 See application file for complete search history.

(56) References Cited

U.S. PATENT DOCUMENTS 6,393,020 B1 *  5/2002  Patton ............... H04L 12/40013
                                              370/362
6,463,373 B2 * 10/2002  Suganuma .......... B60R 16/0232
                                              303/112

(Continued)

FOREIGN PATENT DOCUMENTS

DE       100 07 610 A1    3/2002
DE    10 2011 055 087 A1    5/2013

OTHER PUBLICATIONS

International Search Report (PCT/ISA/210) issued in PCT Application No. PCT/EP2014/076717 dated Mar. 16, 2015, with English translation (six (6) pages).

(Continued)

*Primary Examiner* — Henry Tsai
*Assistant Examiner* — Christopher A Daley
(74) *Attorney, Agent, or Firm* — Crowell & Moring LLP

(57) ABSTRACT

A method is provided for programming a plurality control units of a vehicle via bus, wherein the control units are each put into a persistent bus idle mode, in which mode the control units each send messages on the bus only when the messages are requested from outside of the particular control unit. While the control units are in the persistent bus idle mode, new firmware is written to the control units in a writing process of the particular control unit. At least a subset of the control units is written to such that the particular writing processes of the subset of the control units overlap in time.

11 Claims, 2 Drawing Sheets

(51) Int. Cl.
    *G06F 8/654* (2018.01)
    *B60R 16/023* (2006.01)
    *G05B 15/02* (2006.01)
    *G06F 13/42* (2006.01)

(52) U.S. Cl.
    CPC .......... *G06F 8/654* (2018.02); *G06F 13/4282* (2013.01); *G05B 2219/23316* (2013.01); *G05B 2219/25032* (2013.01); *G05B 2219/2637* (2013.01)

(56) References Cited

U.S. PATENT DOCUMENTS

| | | | |
|---|---|---|---|
| 7,102,383 B2* | 9/2006 | Roger | G11C 16/102 |
| | | | 326/39 |
| 8,131,878 B2* | 3/2012 | Staiger | G06F 15/17375 |
| | | | 327/392 |
| 9,576,137 B2* | 2/2017 | Habel | G06F 21/60 |
| 2004/0153590 A1 | 8/2004 | Roger et al. | |
| 2005/0090906 A1* | 4/2005 | Shi | G11C 16/102 |
| | | | 700/2 |
| 2006/0015861 A1 | 1/2006 | Takata et al. | |
| 2008/0168434 A1* | 7/2008 | Gee | G06F 8/65 |
| | | | 717/173 |

OTHER PUBLICATIONS

German Search Report issued in counterpart German Application No. 10 2014 200 089.0 dated Jul. 7, 2014, with partial English translation (ten (10) pages).

\* cited by examiner

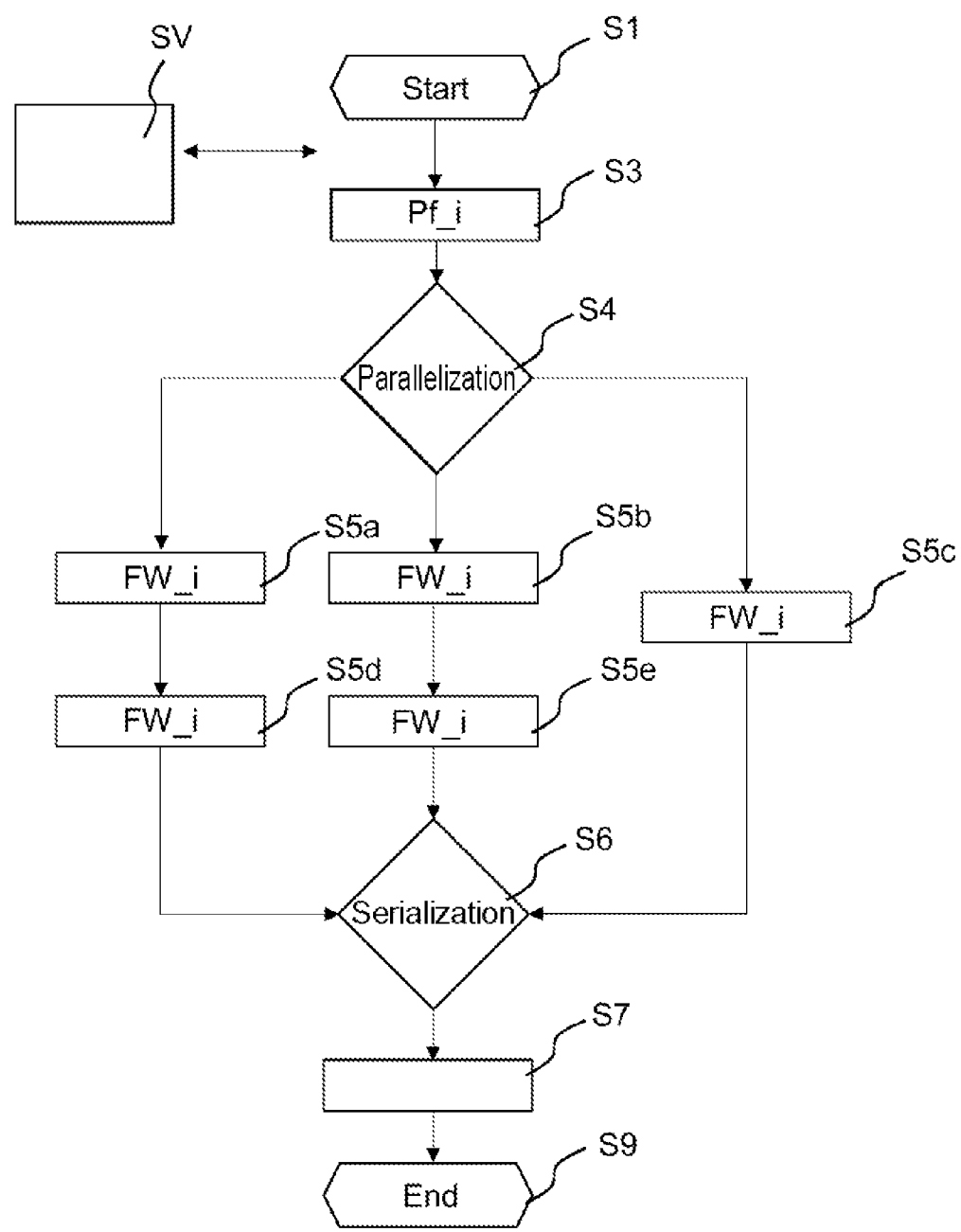

METHOD, DEVICE AND COMPUTER PROGRAM PRODUCT FOR PROGRAMMING A PLURALITY OF CONTROL UNITS

CROSS REFERENCE TO RELATED APPLICATIONS

This application is a continuation of PCT International Application No. PCT/EP2014/076717, filed Dec. 5, 2014, which claims priority under 35 U.S.C. § 119 from German Patent Application No. 10 2014 200 089.0, filed Jan. 8, 2014, the entire disclosures of which are herein expressly incorporated by reference.

BACKGROUND AND SUMMARY OF THE INVENTION

The invention relates to a method for programming a plurality of control units of a vehicle via a bus. The invention also relates to a device, a computer program, and a computer program product for programming a plurality of control units of a vehicle via a bus.

Modern vehicles have an increasingly large number of control units. If new firmware is written to one of these control units, it is possibly likewise necessary to write new firmware to further control units in order to match the control units to one another.

The object on which the invention is based is to provide a method and a corresponding device which contributes to making it possible to effectively program a plurality of control units of a vehicle.

The invention is distinguished by a method for programming a plurality of control units of a vehicle via a bus. The invention is also distinguished by a corresponding device. The control units of the vehicle are each changed to a persistent bus idle mode in which the control units each transmit messages on the bus only if they are requested from outside the respective control unit. While the control units are in the persistent bus idle mode, new firmware is written to each of the control units in a process of writing to the respective control unit. At least one subset of the control units is written to here in such a manner that the respective processes of writing to the subset of the control units overlap in terms of time.

In this context, persistent means that the respective control units are still in the persistent bus idle mode even after a restart. The control units are therefore in a bus idle mode until the latter is externally canceled.

The bus is, in particular, a Controller Area Network (CAN) bus, in particular according to the ISO standard 11898. The CAN bus is a serial bus system and is used, in particular, to network control units in vehicles.

In this context, the overlapping of the respective writing processes in terms of time means that new firmware is written to the respective control units virtually in a parallel manner. Since data are generally transmitted in succession in individual packets on the bus, these are virtually parallel writing processes which overlap in terms of time.

The procedure explained here therefore relates, in particular, to an expansion of the programming sequence according to the ISO standard 14229-1 (2013). The ISO standard 14229-1 specifies the Unified Diagnostic Services (UDS) communication protocol, where UDS is a communication protocol for making contact with and maintaining control units installed in a vehicle. The ISO standard 14229-1 likewise specifies a communication protocol for making contact with and maintaining control units installed in a vehicle via a CAN bus.

The corresponding device includes, in particular, a tester which is in the form of an MCD-3 D system according to the ISO 22900 series of standards, for example. In this case, MCD-3 represents a programming interface for applications for automotive server software. MCD-3 D describes domain-specific functionalities for diagnosing vehicle control units.

As a result of the fact that the writing processes overlap in terms of time, a plurality of control units can be programmed very effectively virtually at the same time since considerably less time is needed in this case than when serially writing to the control units in succession. The parallelism is restricted by a unit for controlling access to the vehicle or by a bus capacity of the bus. The access control unit includes the device, for example. The access control unit and the bus, to which the access control unit is connected, can process only a limited number of messages at the same time without errors. This results in a maximum capacity per bus. This maximum capacity is known to the device and is stored in the device, for example. The maximum capacity is used to avoid transmission errors which would otherwise possibly result in the respective writing process being aborted.

Since not all writing processes are possibly ended at the same time, it is important for the control units to be in the persistent bus idle mode. If the control units are not in the persistent bus idle mode, a control unit would possibly immediately begin again to transmit messages on the bus after a successful writing process and possibly a subsequent restart. These messages may interfere with the remaining writing processes which have not yet been ended or are still pending.

According to one advantageous configuration, the control units are each changed to the persistent bus idle mode by setting a persistent flag in the respective control unit.

A flag denotes, in particular, a data field which is respectively occupied by one of two values, a first value representing a flag which has been set and a second value representing a flag which has not been set. A flag can therefore be used to indicate particular states, in particular. A persistent flag is a flag which is still set even after the respective control unit has been restarted, that is to say until it is externally deleted, in particular.

Setting the persistent flag makes it possible to very effectively change the respective control unit to the persistent bus idle mode.

According to another advantageous configuration, a maximum implementation time is respectively predefined for the respective processes of writing to the control units. If the respective maximum implementation time is exceeded, the respective writing process is restarted.

Each process of writing to a control unit includes, in particular, the steps of deleting, writing and checking. Each of these steps may possibly last for several minutes. In this case, for example, each control unit transmits so-called ResponsePending messages to the device regularly, for example every 5 seconds. These messages include the information indicating that the respective control unit is not yet ready and still requires time for the response. As long as the respective control unit sends these messages, the device possibly does not abort the writing process. Therefore, the respective writing process is possibly not aborted if the respective control unit is in an endless loop.

The respective maximum implementation time prevents the device from endlessly waiting before the respective writing process is aborted. After waiting for the maximum implementation time, the respective writing process is aborted and either a process of writing to the next control unit is started if the control unit containing the error is actually in an endless loop or the process of writing to the control unit containing the error is repeated.

If the respective writing processes are carried out in an overlapping manner in terms of time, the use of the maximum implementation time is particularly advantageous since only limited resources are available in the vehicle and must be taken into account by the device. There is a maximum number of control units which can be handled at the same time on the same bus; if one or more connections are now occupied by a control unit in an endless loop, the performance decreases greatly. The respective maximum implementation time can therefore be used to contribute to the control units being written to very effectively.

According to another advantageous configuration, each software unit is subdivided into a plurality of software subunits. The software subunits of the respective software unit are transmitted to the respective control unit for one of the writing processes. If an error is detected in the respective writing process, only those software subunits which have not yet been transmitted or have been transmitted incorrectly are transmitted to the respective control unit for this writing process.

Since the entire software unit therefore possibly does not need to be transmitted again in the event of an error, but rather only individual software subunits are transmitted, the control units are programmed very effectively as a result.

According to another aspect, the invention is distinguished by a computer program for programming a plurality of control units of a vehicle via a bus, the computer program being designed to carry out the method for programming a plurality of control units of a vehicle via a bus or an advantageous configuration of the method on a data processing device.

According to another aspect, the invention is distinguished by a computer program product comprising executable program code, the program code carrying out the method for programming a plurality of control units of a vehicle via a bus or an advantageous configuration of the method during execution by a data processing device.

The computer program product comprises, in particular, a medium which can be read by the data processing device and stores the program code.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a flowchart for programming the control units of the vehicle via the bus.

DETAILED DESCRIPTION OF THE DRAWINGS

Figure 1:
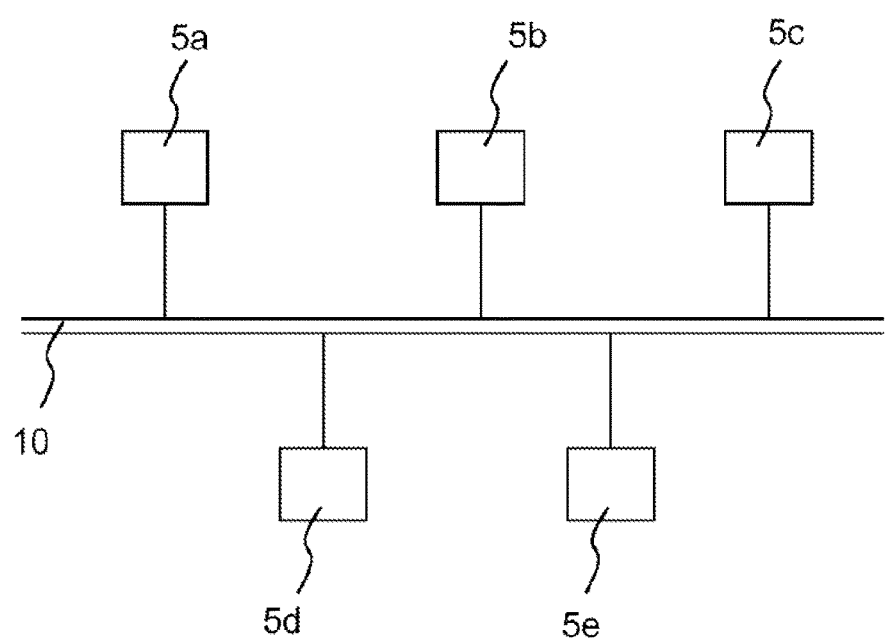
FIG. 1 is a schematic diagram of a bus of a vehicle having a plurality of control units connected to the bus.

FIG. 1 shows a bus 10 of a vehicle. The bus 10 is a CAN bus, for example. A plurality of control units 5*a*, 5*b*, 5*c*, 5*d*, 5*e* are connected to the bus 10 and can therefore communicate with one another via the bus 10. Furthermore, a tester, in particular, can be connected to the bus 10 and can be used to program the control units 5*a*, 5*b*, 5*c*, 5*d*, 5*e*, that is to say can be used to write new firmware to the control units, in particular.

FIG. 2 shows a flowchart for programming the control units 5*a*, 5*b*, 5*c*, 5*d*, 5*e* of the vehicle via the bus 10. In order to program the control units 5*a*, 5*b*, 5*c*, 5*d*, 5*e*, a control device SV, in particular, stores a program, for example in a data and program memory of the control device SV. The control device SV also includes a computing unit for executing the program, for example. The data and program memory and the computing unit are formed in one structural unit, for example, and/or are distributed among two or more structural units. The control device SV is formed, for example, in the tester which can be connected to the bus 10 of the vehicle.

The control device SV can also be referred to as the device for programming a plurality of control units of a vehicle via a bus.

The program is started in a step S1 (FIG. 2), in which variables can be initialized if necessary.

In step S3, the control units 5*a*, 5*b*, 5*c*, 5*d*, 5*e* are each changed to a persistent bus idle mode. In the persistent bus idle mode, the control units 5*a*, 5*b*, 5*c*, 5*d*, 5*e* each transmit messages on the bus 10 only if they are requested from outside the respective control unit 5*a*, 5*b*, 5*c*, 5*d*, 5*e*. For this purpose, a persistent flag PF_i is respectively set in the respective control unit 5*a*, 5*b*, 5*c*, 5*d*, 5*e*, for example.

If all of the control units 5*a*, 5*b*, 5*c*, 5*d*, 5*e* are in the persistent bus idle mode, the program is continued in step S4.

In step S4, parallelization is prepared, with the result that a plurality of steps can then be executed in a virtually parallel manner.

In steps S5*a*, S5*b*, S5*c*, S5*d*, S5*e*, new firmware FW_i is written to each of the control units 5*a*, 5*b*, 5*c*, 5*d*, 5*e* in a process of writing to the respective control unit 5*a*, 5*b*, 5*c*, 5*d*, 5*e*. In this case, at least one subset of the control units 5*a*, 5*b*, 5*c*, 5*d*, 5*e* is written to in such a manner that the respective processes of writing to the subset of the control units 5*a*, 5*b*, 5*c*, 5*d*, 5*e* overlap in terms of time. For example, as shown in FIG. 2, new firmware FW_i is written to the control units 5*a*, 5*b*, 5*c* in an overlapping manner in terms of time and, after the control units 5*a* and 5*b* have been written to, new firmware FW_i is written to the control units 5*d*, 5*e*, 5*c* in an overlapping manner in terms of time.

On account of the capacity of the bus 10 for example, not all control units 5*a*, 5*b*, 5*c*, 5*d*, 5*e* can possibly be written to in a virtually parallel manner and so a subset of the control units 5*a*, 5*b*, 5*c*, 5*d*, 5*e* is possibly programmed in an overlapping manner in terms of time and the remaining control units 5*a*, 5*b*, 5*c*, 5*d*, 5*e* and/or a further subset is/are then programmed. If, for example, the capacity of the bus 10 suffices, all control units 5*a*, 5*b*, 5*c*, 5*d*, 5*e* can alternatively also be written to in a virtually parallel manner. Virtually parallel writing is possible since each writing process comprises a plurality of steps. These steps include, in particular, deleting, writing and checking. Only a small bus load is produced in the deleting and checking steps, in particular. For example, a flash memory of the control unit 5*a* can be deleted and a flash memory of the control unit 5*b* can be written to at the same time.

A maximum implementation time is predefined, for example, for the respective processes of writing to the control units 5*a*, 5*b*, 5*c*, 5*d*, 5*e*. If the respective maximum implementation time is exceeded, the respective writing process is restarted, for example.

Alternatively or additionally, each software unit is subdivided into a plurality of software subunits for the respective writing processes. Furthermore, the software subunits of the respective software unit are transmitted to the respective control unit $5a$, $5b$, $5c$, $5d$, $5e$ for one of the writing processes in each case. If an error is detected in the respective writing process, only those software subunits which have not yet been transmitted or have been transmitted incorrectly are transmitted to the respective control unit $5a$, $5b$, $5c$, $5d$, $5e$ for this writing process.

If new firmware FW_i has been successfully written to all control units $5a$, $5b$, $5c$, $5d$, $5e$, the program is continued in a step S6.

In step S6, serialization is effected, with the result that the subsequent steps are then carried out sequentially again.

In step S7, the respective control units $5a$, $5b$, $5c$, $5d$, $5e$ are changed to a mode free of a persistent bus idle. For this purpose, the respective persistent flag PF_i in the respective control unit $5a$, $5b$, $5c$, $5d$, $5e$ is deleted, for example.

The program is then ended in step S9 and can be started again in step S1 if necessary.

The procedure explained makes it possible to program a plurality of control units $5a$, $5b$, $5c$, $5d$, $5e$ of a vehicle in a virtually parallel and therefore very efficient manner.

LIST OF REFERENCE SYMBOLS $5a$, $5b$, $5c$, $5d$, $5e$ Control unit
10 Bus
PF_i Respective persistent flag
FW_i Respective new firmware The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for programming a plurality of control units of a vehicle via a bus, the method comprising that acts of:
    changing each of the plurality of control units to a persistent bus idle mode in which said control units each transmit messages on the bus only if requested from outside a respective control unit;
    while the plurality of control units are in the persistent bus idle mode, writing new firmware to each of the control units in a process of writing to the respective control units, wherein at least one subset of the plurality of control units is written to such that respective processes of writing to the subset of the control units overlap in terms of time,
    wherein each of said control units remains in the persistent bus idle mode until the persistent bus idle mode is externally canceled.

2. The method according to claim 1, wherein each of the control units are changed to the persistent bus idle mode by setting a persistent flag in the respective control unit.

3. The method according to claim 1, further comprising the acts of:
    predefining a maximum implementation time for the respective processes of writing to the control units; and
    restarting the respective writing process if the respective maximum implementation time is exceeded.

4. The method according to claim 1, wherein:
    each software unit is subdivided into a plurality of software subunits,
    the software subunits of the respective software unit are transmitted to the respective control unit for one of the writing processes; and
    if an error is detected in the respective writing process, only those software subunits which have not yet been transmitted or have been transmitted incorrectly are transmitted to the respective control unit for this writing process.

5. The method according to claim 1, wherein each of said control units remains in the persistent bus idle mode after a restart.

6. A device for programming a plurality of control units of a vehicle via a bus, the device comprising:
    a computing unit and associated memory storing program code that, when executed by the computing unit, carries out:
    changing each of the plurality of control units to a persistent bus idle mode in which said control units each transmit messages on the bus only if requested from outside a respective control unit;
    while the plurality of control units are in the persistent bus idle mode, writing new firmware to each of the control units in a process of writing to the respective control units, wherein at least one subset of the plurality of control units is written to such that respective processes of writing to the subset of the control units overlap in terms of time,
    wherein each of said control units remains in the persistent bus idle mode until the persistent bus idle mode is externally canceled.

7. The device according to claim 6, wherein each of said control units remains in the persistent bus idle mode after a restart.

8. A computer program product for programming a plurality of control units of a vehicle via a bus, the computer program product comprising a non-transitory computer readable medium having stored thereon program code that, when executed, causes a processor to:
    change each of the plurality of control units to a persistent bus idle mode in which said control units each transmit messages on the bus only if requested from outside a respective control unit;
    while the plurality of control units are in the persistent bus idle mode, write new firmware to each of the control units in a process of writing to the respective control units, wherein at least one subset of the plurality of control units is written to such that respective processes of writing to the subset of the control units overlap in terms of time,
    wherein each of said control units remains in the persistent bus idle mode until the persistent bus idle mode is externally canceled.

9. The computer program product according to claim 8, wherein each of the control units are changed to the persistent bus idle mode by setting a persistent flag in the respective control unit.

10. The computer program product according to claim 8, wherein the stored program code, when executed, further causes a process to:
    predefine a maximum implementation time for the respective processes of writing to the control units; and
    restart the respective writing process if the respective maximum implementation time is exceeded.

11. The computer program product according to claim 8, wherein each of said control units remains in the persistent bus idle mode after a restart.

* * * * *